United States Patent
Mori et al.

(10) Patent No.: US 10,073,000 B2
(45) Date of Patent: Sep. 11, 2018

(54) RIM REPLACING METHOD FOR TIRE TESTING MACHINE

(71) Applicant: Kabushiki Kaisha Kobe Seiko Sho (Kobe Steel, Ltd.), Hyogo (JP)

(72) Inventors: Maiko Mori, Takasago (JP); Yoshiaki Matsubara, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 218 days.

(21) Appl. No.: 14/958,997

(22) Filed: Dec. 4, 2015

(65) Prior Publication Data

US 2016/0243894 A1    Aug. 25, 2016

(30) Foreign Application Priority Data

Feb. 19, 2015 (JP) ................. 2015-030234

(51) Int. Cl.
G01M 17/02 (2006.01)
G01M 1/16 (2006.01)
G01M 1/04 (2006.01)
B60B 30/08 (2006.01)

(52) U.S. Cl.
CPC .............. G01M 1/16 (2013.01); G01M 1/04 (2013.01); G01M 17/021 (2013.01); B60B 30/08 (2013.01); Y10T 29/4973 (2015.01)

(58) Field of Classification Search
CPC ........ G01M 1/16; G01M 1/04; G01M 17/021; B60B 30/08; Y10T 29/4973
See application file for complete search history.

(56) References Cited

U.S. PATENT DOCUMENTS 9,194,767 B2 * 11/2015 Tachibana ........... G01M 17/021
9,321,315 B2    4/2016 Matsunaga et al.
2013/0233067 A1 * 9/2013 Wollbrinck ......... G01M 17/021
                                                    73/146

FOREIGN PATENT DOCUMENTS

JP     H02024358 U       2/1990
JP     2011-174839 A     9/2011
WO     2012/063281 A1    5/2012
WO     WO 2013105318 A1 * 7/2013 ........ G01M 17/021

* cited by examiner

Primary Examiner — Sarang Afzali
Assistant Examiner — Ruth G Hidalgo-Hernande
(74) Attorney, Agent, or Firm — Studebaker & Brackett PC

(57) ABSTRACT

In a rim replacing method for a tire testing machine of the present invention, one pair of the rims satisfying predetermined conditions relative to a test tire are selected, from among a pair of rims attached to the upper and lower spindles and plural pairs of rims loaded in a rim replacing device, as object rims, and rim replacement is performed if the rims loaded in the rim replacing device are selected as the object rims, so that the nonuniformity of rim can be suitably measured. The predetermined conditions include a condition in which a diameter of bead portions of the tire conveyed into the tire testing machine corresponds to a diameter of the object rims, and a condition in which a width of the bead portions of the tire conveyed into the tire testing machine falls within a range in which a space between the object rims is adjustable.

5 Claims, 6 Drawing Sheets

FIG.3
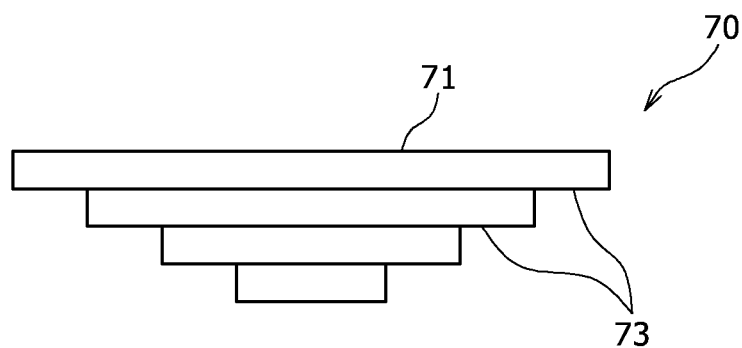
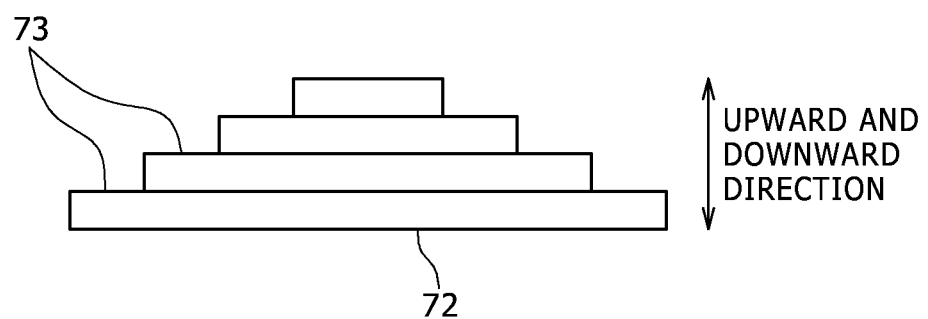

RIM REPLACING METHOD FOR TIRE TESTING MACHINE

BACKGROUND OF THE INVENTION

Field of the Invention

The present invention relates to a rim replacing method for a tire testing machine in which a pair of rims attached to upper and lower spindles and any of a plurality of pairs of rims loaded in a rim replacing device are replaced with each other.

Description of the Related Art

JP 2011-174839 A discloses a rim replacing device and a rim replacing method for a tire testing machine in which a lower pseudo-rim is conveyed while suspended on a lower surface side of a seat plate in a rim stocker. According to a technique disclosed in JP 2011-174839 A, rims can be easily and automatically replaced without using any rim pallets and attachments.

JP 2011-174839 A describes selecting rims corresponding to a bead diameter of a tire and measuring the nonuniformity using these rims. However, if rims only corresponding to a bead diameter are merely selected, the nonuniformity may fail to be suitably measured. In other words, if a width of a bead portion of a tire is not within a range in which a space between a pair of rims is adjustable, the bead portion of the tire cannot be suitably sandwiched between an upper rim and the lower rim. Moreover, if a measurement location of the lateral run-out is located at an inner side relative to an outer circumference of the rims, the rims cause interference so that the lateral run-out cannot be safely measured. Herein the lateral run-out is shaking in the tire width direction.

An object of the present invention is to provide a rim replacing method for a tire testing machine in which the nonuniformity can be suitably measured.

SUMMARY OF THE INVENTION

The present invention provides a rim replacing method for a tire testing machine in which a pair of rims attached to upper and lower spindles and any of a plurality of pairs of rims loaded in a rim replacing device are replaced with each other, the method including: a selection step of selecting, from among the pair of rims and the plurality of pairs of rims, one pair of rims satisfying predetermined conditions relative to a tire conveyed into the tire testing machine as object rims; and a replacement step of replacing the pair of rims with the object rims if the rims loaded in the rim replacing device are selected as the object rims, in which the predetermined conditions include a condition in which a diameter of bead portions of the tire conveyed into the tire testing machine corresponds to a diameter of the object rims, and a condition in which a width of the bead portions of the tire conveyed into the tire testing machine falls within a range in which a space between the object rims is adjustable.

Moreover, the present invention provides a rim replacing method for a tire testing machine in which a pair of rims attached to upper and lower spindles and any of a plurality of pairs of rims loaded in a rim replacing device are replaced with each other, the method including: a selection step of selecting, from among the pair of rims and the plurality of pairs of rims, one pair of rims satisfying predetermined conditions relative to a tire conveyed into the tire testing machine as object rims; and a replacement step of replacing the pair of rims with the object rims if the rims loaded in the rim replacing device are selected as the object rims, in which the predetermined conditions include a condition in which a diameter of bead portions of the tire conveyed into the tire testing machine corresponds to a diameter of the object rims, and a condition in which a measurement location of the lateral run-out in the tire conveyed into the tire testing machine is located at an outer side relative to an outer circumference of the object rims.

According to the present invention, the nonuniformity can be suitably measured.

BRIEF DESCRIPTION OF THE DRAWINGS

FIG. 3 is a side view of a rim.

DESCRIPTION OF THE PREFERRED EMBODIMENTS

Hereinafter, preferred embodiments of the present invention will be described in detail with reference to the accompanying drawings.

First Embodiment

Configuration of Tire Testing Machine

A rim replacing method for a tire testing machine (rim replacing method) according to a first embodiment of the present invention is to replace a pair of rims attached to upper and lower spindles with any of a plurality of pairs of rims loaded in a rim replacing device.

Figure 1:
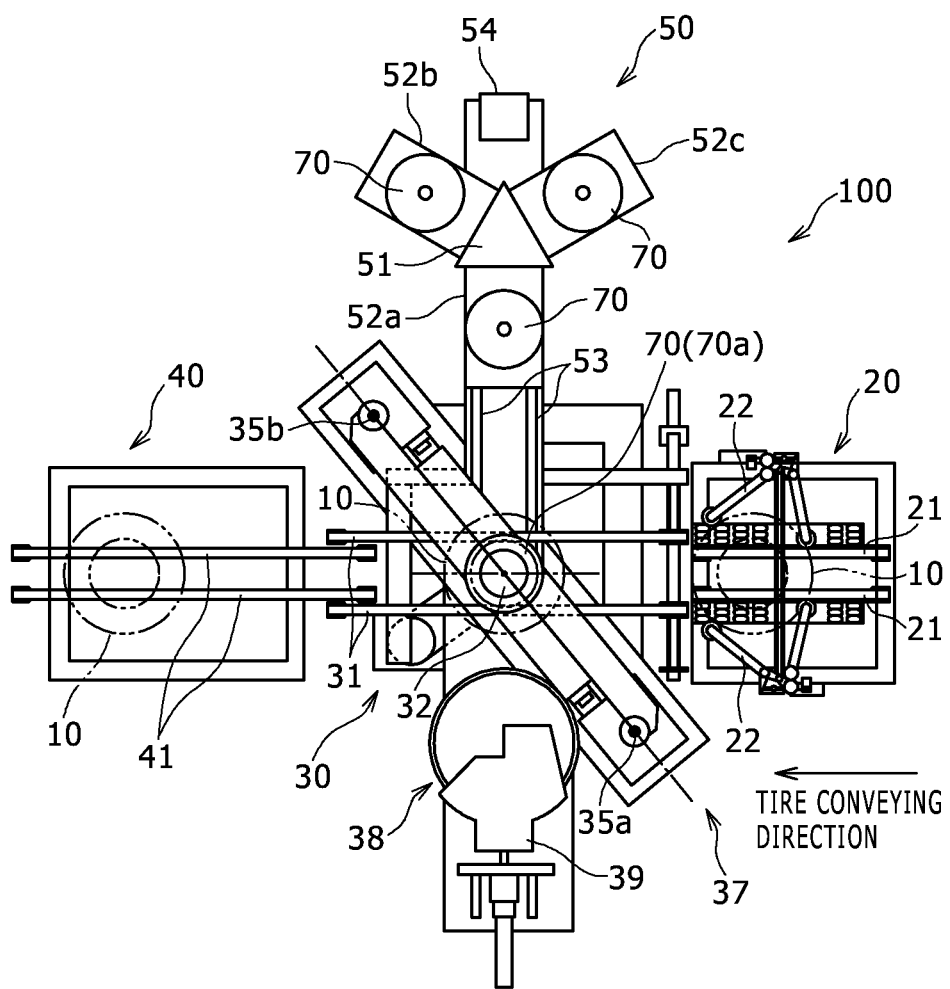
FIG. 1 is a top view illustrating the entirety of a tire testing machine.
Figure 2:
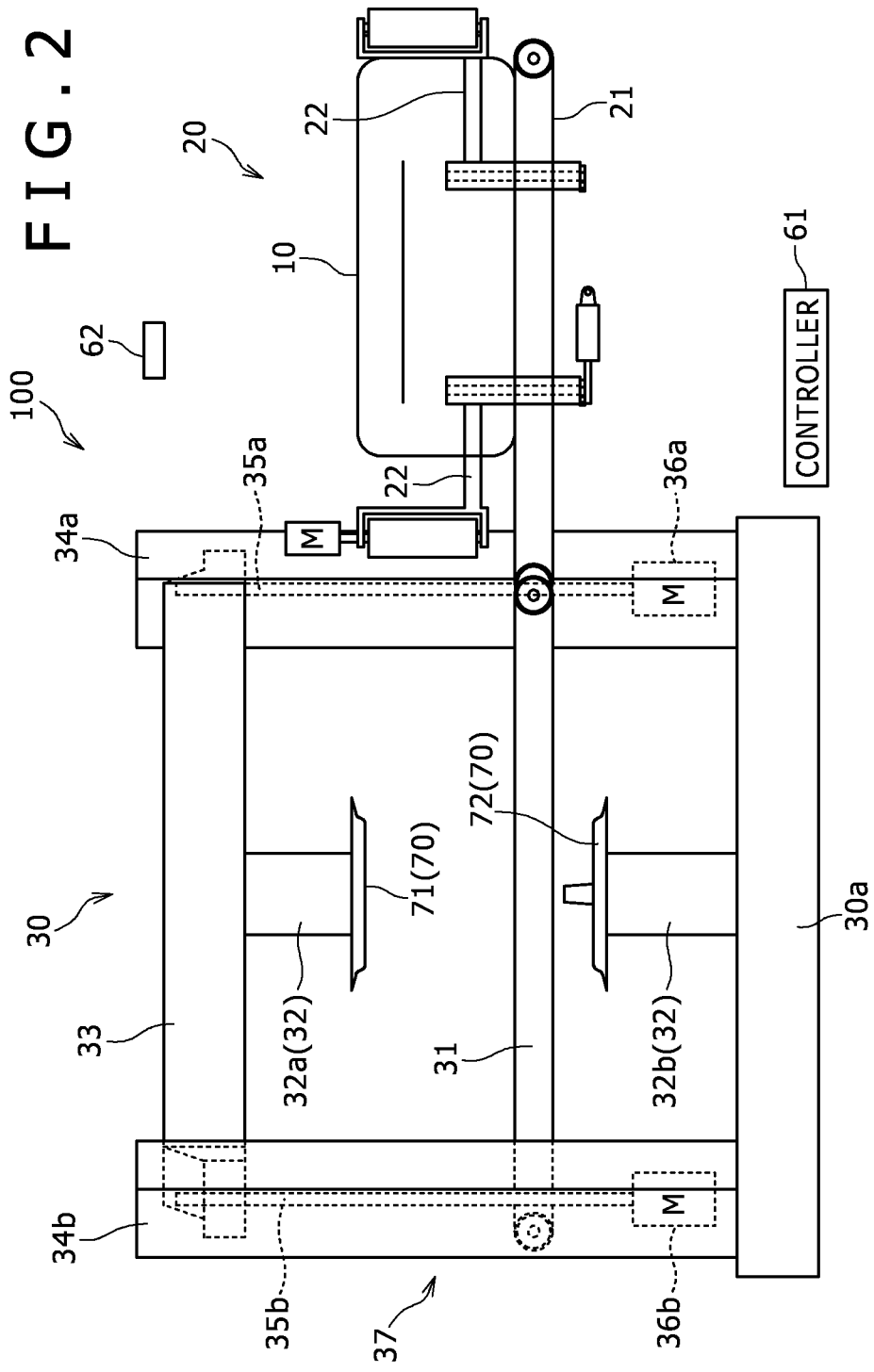
FIG. 2 is a side view illustrating the tire testing machine.

As illustrated in FIG. 1 which is a top view and FIG. 2 which is a side view, a tire testing machine 100 includes a bead lubricating unit 20, a testing station 30, and a marking unit 40 along a direction of conveying a test tire 10 (tire conveying direction) in this order, while including a rim replacing device 50 at a position facing the testing station 30. Note that FIG. 2 illustrates the bead lubricating unit 20 and the testing station 30 only.

(Bead Lubricating Unit)

The bead lubricating unit 20 is a station for centering the test tire 10 and applying a lubricant to an upper bead portion and a lower bead portion of the test tire 10. The upper bead portion and the lower bead portion are hereinafter collectively referred to as bead portions.

The bead lubricating unit 20 includes an entrance conveyor 21. The entrance conveyor 21 includes a pair of conveyor belts and conveys the test tire 10 placed thereon in a laid state. Arm members 22 for centering the test tire 10 are disposed at corresponding sides of the entrance conveyor 21.

A barcode (identification information) is attached to a side surface in the vicinity of the bead portions of the test tire 10. As illustrated in FIG. 2, a barcode scanner 62 is suspended above the entrance conveyor 21. The barcode scanner 62 detects the barcode and reads information in the barcode. The barcode scanner 62 is disposed at such a position as to be capable of reading the barcode attached to the test tire 10. The information in the barcode that has been read by the barcode scanner 62 is transmitted to a controller 61.

(Testing Station)

The testing station 30 is a station for measuring the nonuniformity of the test tire 10. The testing station 30 includes a center conveyor 31, upper and lower spindles 32, a chucking mechanism 37, and a drum 38.

The center conveyor 31 includes a pair of conveyor belts, and is connected to the entrance conveyor 21 at a conveying direction downstream side thereof, and arranged in such a manner as to extend into the testing station 30. The center conveyor 31 feds the test tire 10 that has been received from the entrance conveyor 21 to a rotation center position of the vertical upper and lower spindles 32 provided in the testing station 30.

The upper and lower spindles 32 include an upper spindle 32a and a lower spindle 32b. The upper spindle 32a is moved upward and downward by the chucking mechanism 37 and rotatable about the axis along the vertical direction. The lower spindle 32b is attached to a lower frame 30a and rotatable about the axis along the vertical direction. The lower spindle 32b is rotated by being driven by an unillustrated motor. The upper spindle 32a engages with the lower spindle 32b and rotates together with the lower spindle 32b.

An upper rim 71 is detachably attached to a lower end portion of the upper spindle 32a. The upper rim 71 is rotatable about the axis along the vertical direction together with the upper spindle 32a. Meanwhile, a lower rim 72 is detachably attached to an upper end portion of the lower spindle 32b. The lower rim 72 is rotatable about the axis along the vertical direction together with the lower spindle 32b. The upper rim 71 and the lower rim 72 are hereinafter collectively referred to as a pair of rims 70, or simply as rims 70.

While the centers of the upper and lower spindles 32 are aligned with the axis of the test tire 10 that has been conveyed by the center conveyor 31, the upper and lower spindles 32 sandwich the test tire 10 from both upward and downward using the pair of rims 70. Meanwhile, the upper spindle 32a is moved upward and downward, thereby adjusting a space between the upper rim 71 and the lower rim 72. The pair of rims 70 that are being detachably attached to the corresponding upper and lower spindles 32 are hereinafter referred to as "current rims."

The chucking mechanism 37 allows the upper and lower spindles 32 to be driven and thereby perform a chucking operation. The chucking mechanism 37 includes a slide beam 33, guide frames 34a, 34b, ball screws 35a, 35b, and motors 36a, 36b. The upper spindle 32a is fixed to the slide beam 33. The chucking mechanism 37 allows the ball screws 35a, 35b to rotate by the motors 36a, 36b, and thereby allows the slide beam 33 to move upward and downward, thereby moving the upper spindle 32a upward and downward.

As illustrated in FIG. 1, the drum 38 has a flat cylindrical shape and includes a rotation shaft at the center, and is supported by a support frame 39 in a manner rotatable about the vertical direction. Unillustrated load cells that detect a pressing load of the test tire 10 are disposed at both corresponding ends of the rotation shaft of the drum 38.

The nonuniformity of the test tire 10 that is measured by the testing station 30 includes the lateral run-out. Herein the lateral run-out is shaking in the tire width direction.

(Marking Unit)

The marking unit 40 is a station for marking the test tire 10 at a required part in which the nonuniformity has been measured by the testing station 30. The marking unit 40 includes an exit conveyor 41. The exit conveyor 41 is connected to the center conveyor 31 at the downstream side, and conveys the test tire 10 in which various performance tests have been performed. Moreover, the marking unit 40 includes an unillustrated marking device for marking the required part of the test tire 10.

(Rim Replacing Device)

The rim replacing device 50 is a station for stocking a plurality of pairs of the rims 70 corresponding the test tire 10 of a plurality of types and performing rim replacement with the upper and lower spindles 32 according to the types of the test tire 10. The rim replacement as used herein means replacing the "current rims" attached to the upper and lower spindles 32 with any of the plurality of pairs of the rims 70 loaded in the rim replacing device 50.

The rim replacing device 50 includes a pivot base 51. A plurality of stocker frames 52a to 52c is fixedly disposed on the pivot base 51. In this embodiment, the number of the stocker frames 52a to 52c is "three," which is not limitative. The stocker frame 52a is in a state in which the rims 70 are not attached such that the current rims attached to the upper and lower spindles 32 can be retracted into and placed on this stocker frame 52a. On the other hand, one pair of the rims 70 are replaceably placed on each of the stocker frames 52b, 52c. In other words, the rim replacing device 50 stocks two pairs of the rims 70.

A pivot actuating servomotor 54 enables the pivot base 51 to pivot. Moreover, the pivot base 51 travels on a pair of travel rails 53 and can move forward and rearward in a direction orthogonal to the tire conveying direction. The two pairs of the rims 70 stocked in the rim replacing device 50 are hereinafter referred to as "rims B" and "rims C." Specifically, the rims 70 placed on the stocker frame 52b are referred to as the "rims B," while the rims 70 placed on the stocker frame 52c are referred to as the "rims C."

(Rims)

As illustrate in FIG. 3 which is a side view, the upper rim 71 and the lower rim 72 have a disk shape. A plurality of step portions 73 having diameters different from each other are formed on a lower surface of the upper rim 71 and an upper surface of the lower rim 72. In other words, the upper rim 71 and the lower rim 72 are each a multi-step rim. The multi-step rim is employed for each of the "current rims," the "rim B," and the "rim C." In this embodiment, the number of the step portions is "three", which is not limitative, and may be two or more. A thickness of each of the upper rim 71 and the lower rim 72 increases toward a corresponding center thereof.

An end portion of each of the bead portions of the test tire 10 is fitted to one of the plurality of step portions 73. Meanwhile, each of the bead portions comes into contact with a horizontal plane of the step portions 73 to which the end portion of each of the bead portions is fitted, thereby sealing high-pressure air in the test tire 10. In this manner, each of the bead portions of the test tire 10 is sandwiched by the corresponding one of the step portions 73.

Here, the test tire 10 is of a plurality of types having diameters of the bead portions (bead diameters) different from each other. However, the upper rim 71 and the lower rim 72 are each a multi-step rim so that the test tire 10 of a plurality of types having bead diameters different from each other can be sandwiched by each of the corresponding plurality of step portions 73. Thus, the number of the rims 70 retained can be reduced.

The plurality of step portions 73 is configured to have diameters different from each other, for example, at an interval of 2 inches. In this embodiment, the "current rims" each include three step portions in which diameters thereof are 12, 14, and 16 inches, respectively. Meanwhile, the "rims B" each include three step portions in which diameters thereof are 14, 16, and 18 inches, respectively. Meanwhile, the "rims C" each include three step portions in which diameters thereof are 16, 18, and 20 inches, respectively. In this manner, each of the three rims ("current rims," "rims B," and "rims C") copes with three types of bead diameters. The diameter of each of the step portions 73 is hereinafter referred to as a rim diameter.

Note that the test tire 10 is of a plurality of types having widths of the bead portions (bead widths) different from each other. Specifically, the test tire 10 may be of types having the same bead diameter and bead widths different from each other. Herein, the bead width is a thickness between the upper bead portion and the lower bead portion. As described above, the upper spindle 32a is moved upward and downward, thereby adjusting a space between the upper rim 71 and the lower rim 72, whereas a movement range of the upper spindle 32a is fixed so that the space between the upper rim 71 and the lower rim 72 has an upper limit and a lower limit. Consequently, the test tire 10 having a bead width greater than the upper limit fails to be sandwiched. Moreover, the test tire 10 having a bead width less than the lower limit fails to be sandwiched.

Further, the pair of rims 70 include multi-step rims each having a thickness that increases toward a corresponding center thereof. Accordingly, the test tire 10 having a larger bead diameter and a smaller bead width requires the upper rim 71 to draw nearer the lower rim 72. However, depending on the rims 70, a center portion of the upper rim 71 and a center portion of the lower rim 72 may come into contact with each other before the space between the upper rim 71 and the lower rim 72 reaches the lower limit.

In this regard, a range in which a space between the pair of rims 70 is adjustable is configured to be different depending on thicknesses of the rims 70. In other words, the rims 70 having fewer number of steps and a smaller thickness allow the upper rim 71 to be further lowered without causing the center portion of the upper rim 71 and the center portion of the lower rim 72 to come into contact with each other. Thereby, the test tire 10 having a smaller bead width can be sandwiched. Thus, the rims 70 having fewer number of steps and a smaller thickness allow the range in which the space between the pair of rims 70 is adjustable to be configured up to further downward.

Moreover, the range in which the space between the pair of rims 70 is adjustable is configured to be different depending on heights of the step portions 73 that cope regardless of the same number of the steps. For example, the "current rims" and the "rims B" each include the step portions 73 that cope with a bead diameter of 16 inches, and the "current rims" include these step portions that are the third innermost (the outermost), whereas the "rims B" include these step portions that are the second innermost. Accordingly, the "rims B" in which the step portions that cope are further inside can allow the upper rim 71 to draw nearer the lower rim 72 with respect to the test tire 10 having a bead diameter of 16 inches. Consequently, even though the bead width is configured such that the center portion of the upper rim 71 and the center portion of the lower rim 72 come into contact with each other when an attempt to sandwich the test tire 10 by the "current rims" is made, the "rims B" may be capable of suitably sandwiching the same. Thus, the step portions 73 that cope being further inside allow the range in which the space between the pair of rims 70 is adjustable to be configured up to further downward.

Moreover, a measurement location of the lateral run-out is provided at a sidewall of the test tire 10. Accordingly, the rims 70 having a large outer diameter may interfere with the measurement location of the lateral run-out.

However, the different types of rims 70 include the step portions 73 having different rim diameters so that the different types of rims 70 have different outer diameters. For example, the "current rims" and the "rims C" each include the step portions 73 that cope with a bead diameter of 16 inches, and the "current rims" include the step portions 73 having a rim diameter of 16 inches that are the outermost, whereas the "rims C" include the step portions 73 having a rim diameter of 20 inches that are the outermost. In other words, the "rims C" have a larger outer diameter. Consequently, when the test tire 10 having a bead diameter of 16 inches is sandwiched, the rims 70 that are the "rims C" having a larger outer diameter may interfere with the measurement location of the lateral run-out, whereas the rims 70 that are the "current rims" having a smaller outer diameter may not interfere with the measurement location of the lateral run-out.

(Controller)

The controller 61 determines whether to perform the rim replacement between the upper and lower spindles 32 and the rim replacing device 50 based on information in the barcode that has been read by the barcode scanner 62. The barcode contains information, such as a bead diameter, a bead width, a measurement location of the lateral run-out in the test tire 10. Note that these information may be configured in such a manner as to be externally input by an operator.

Here, the controller 61 controls the tire testing machine 100 in such a manner as to perform a selection step of selecting, from among the "current rims" that are attached to the upper and lower spindles 32 and the "rims B" and "rims C" that are loaded in the rim replacing device 50, one pair of the rims 70 satisfying predetermined conditions relative to the test tire 10 as the object rims 70a, and a replacement step of replacing the "current rims" with the object rims 70a if the rims 70 loaded in the rim replacing device 50 are selected as the object rims 70a.

Here, the predetermined conditions include a condition in which the bead diameter of the test tire 10 corresponds to one of rim diameters of the plurality of step portions 73 of the object rims 70a. As described above, the test tire 10 is of a plurality of types having bead diameters different from each other. Then, the controller 61 selects the object rims 70a which include the step portions 73 having a rim diameter corresponding to the bead diameter of the test tire 10. Thereby, the object rims 70a can be fitted to the bead portions of the test tire 10 without a gap to sandwich the same. Accordingly, leakage of the air from between the bead portions and the object rims 70a during filling of the air into the test tire 10 and breakage of the test tire 10 during measurement can be prevented.

Moreover, the predetermined conditions include a condition in which the bead width of the test tire 10 falls within a range in which a space between the object rims 70a is adjustable. As described above, the test tire 10 may be of a plurality of types having bead widths different from each other. In addition, the test tire 10 having a larger bead diameter and a smaller bead width requires the upper rim 71 and the lower rim 72 to draw nearer each other, and the upper rim 71 and the lower rim 72 may come into contact with each other. Then, the controller 61 selects the object rims 70a in which the bead width of the test tire 10 falls within the range in which the space is adjustable. Thereby, the bead portions of the test tire 10 can be suitably sandwiched such that the upper rim 71 and the lower rim 72 fail to come into contact with each other. Accordingly, breakage of the upper rim 71 and the lower rim 72 due to contact thereof with each other can be prevented.

Moreover, the predetermined conditions include a condition in which a measurement location of the lateral run-out in the test tire 10 is located at an outer side relative to an outer circumference of the object rims 70a. As described above, the rims 70 having a large outer diameter may interfere with the measurement location of the lateral run-out. Then, the controller 61 selects the object rims 70a in which the measurement location of the lateral run-out is located at the outer side relative to the outer circumference. Thereby, interference of the object rims 70a with the measurement location of the lateral run-out can be prevented. Accordingly, the lateral run-out can be safely measured.

In this manner, configuring the predetermined conditions of selecting the object rims 70a to be detailed enables selection of the rims 70 more suitable for the test tire 10 conveyed into the tire testing machine 100. Accordingly, the nonuniformity can be suitably measured.

Note that if none of the "rims B," the "rims C," and the "current rims" satisfies all the above predetermined conditions, a production operation is stopped, and the desired rims 70 stocked in the exterior and any of the plurality of pairs of rims 70 loaded in the rim replacing device 50 are replaced with each other. However, without the rim replacement between the exterior and the rim replacing device 50, the test tire 10 of a plurality of types having bead diameters different from each other can be sandwiched using the "current rims" that have been already attached to the upper and lower spindles 32 and the "rims B" and the "rims C" that have been already loaded in the rim replacing device 50. Accordingly, even if the test tire 10 of various types is measured in one line, the number of times of the rim replacement between the exterior and the rim replacing device 50 can be reduced. Thereby, the number of times of stopping a production operation can be reduced so that a production efficiency can be improved.

(Rim Replacing Processing Routine)

Next, the rim replacing method will be described with reference to a rim replacing processing routine illustrated in FIGS. 4 and 5 that are a flowchart. This rim replacing processing routine is executed by the controller 61. The test tire 10 conveyed into the testing station 30 is hereinafter referred to as a "next tire."

Figure 4:
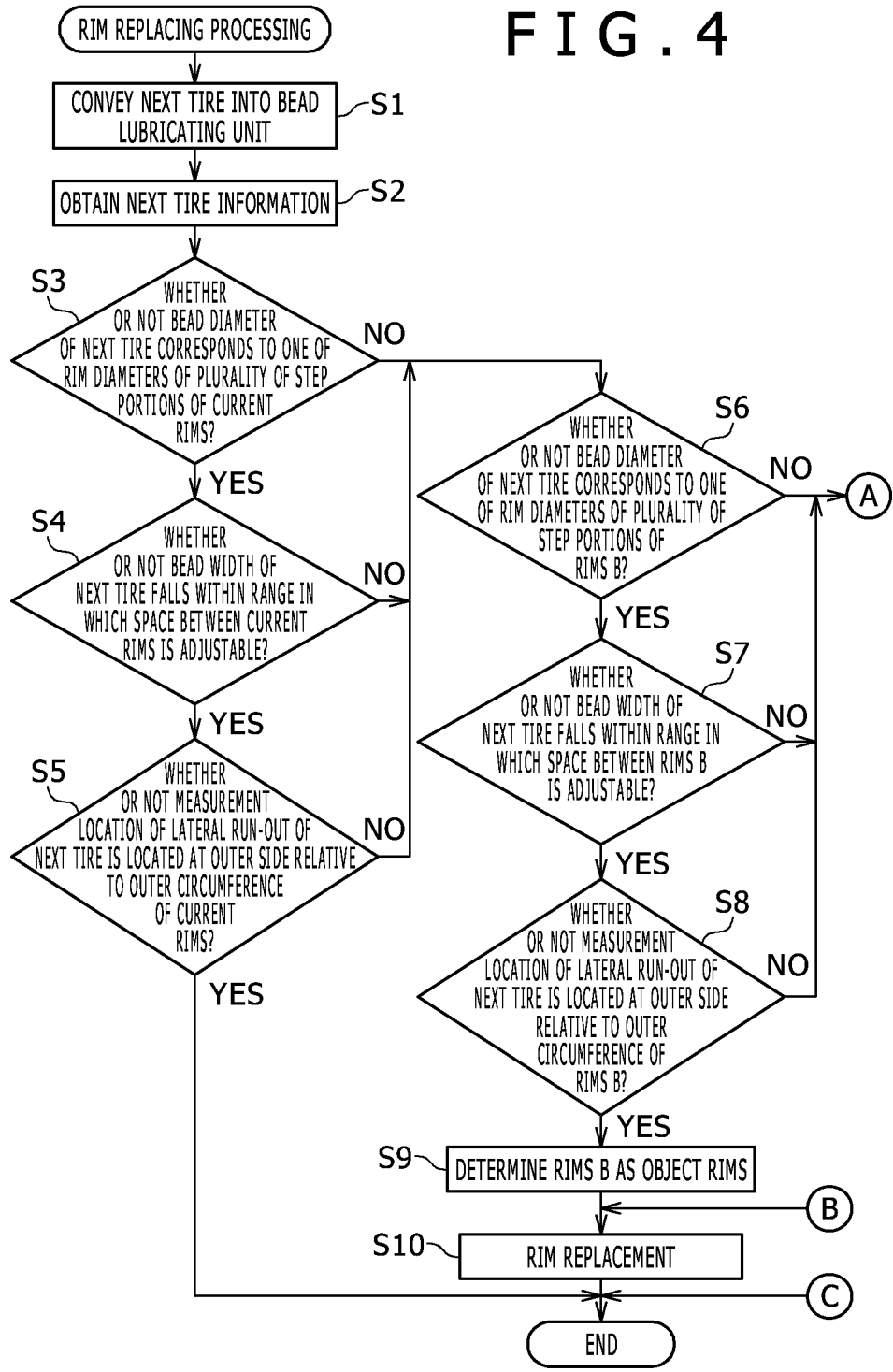
FIG. 4 is a flowchart illustrating a rim replacing processing for the tire testing machine.

First, as illustrated in FIG. 4, the next tire is conveyed into the bead lubricating unit 20 (step S1). Subsequently, a barcode on the next tire is read by the barcode scanner 62, thereby obtaining information of the next tire (step S2).

Then, whether or not a bead diameter of the next tire corresponds to one of rim diameters of the plurality of step portions 73 of the current rims is determined (step S3). In step S3, if the bead diameter of the next tire is determined to correspond to none of the rim diameters of the plurality of step portions 73 of the current rims (S3: NO), the processing proceeds to step S6. On the other hand, in step S3, if the bead diameter of the next tire is determined to correspond to one of the rim diameters of the plurality of step portions 73 of the current rims (S3: YES), whether or not a bead width of the next tire falls within a range in which a space between the current rims is adjustable is determined (step S4).

In step S4, if the bead width of the next tire is determined to fail to fall within the range in which the space between the current rims is adjustable (S4: NO), the processing proceeds to step S6. On the other hand, in step S4, if the bead width of the next tire is determined to fall within the range in which the space between the current rims is adjustable (S4: YES), whether or not a measurement location of the lateral run-out of the next tire is located at an outer side relative to an outer circumference of the current rims is determined (step S5).

In step S5, if the measurement location of the lateral run-out of the next tire is determined to fail to be located at the outer side relative to the outer circumference of the current rims (S5: NO), the processing proceeds to step S6. On the other hand, in step S5, if the measurement location of the lateral run-out of the next tire is determined to be located at the outer side relative to the outer circumference of the current rims (S5: YES), the present routine is terminated. Then, measurement is performed using the current rims as the object rims 70a.

In step S6, whether or not the bead diameter of the next tire corresponds to one of rim diameters of the plurality of step portions 73 of the rims B is determined. In step S6, if the bead diameter of the next tire is determined to correspond to none of the rim diameters of the plurality of step portions 73 of the rims B (S6: NO), the processing proceeds to step S11. On the other hand, in step S6, if the bead diameter of the next tire is determined to correspond to one of the rim diameters of the plurality of step portions 73 of the rims B (S6: YES), whether or not the bead width of the next tire falls within a range in which a space between the rims B is adjustable is determined (step S7).

In step S7, if the bead width of the next tire is determined to fail to fall within the range in which the space between the rims B is adjustable (S7: NO), the processing proceeds to step S11. On the other hand, in step S7, if the bead width of the next tire is determined to fall within the range in which the space between the rims B is adjustable (S7: YES), whether or not the measurement location of the lateral run-out of the next tire is located at an outer side relative to an outer circumference of the rims B is determined (step S8).

In step S8, if the measurement location of the lateral run-out of the next tire is determined to fail to be located at the outer side relative to the outer circumference of the rims B (S8: NO), the processing proceeds to step S11. On the other hand, in step S8, if the measurement location of the lateral run-out of the next tire is determined to be located at the outer side relative to the outer circumference of the rims B (S8: YES), the rims B are determined as the object rims 70a (step S9). Then, the rim replacement between the current rims and the rims B is performed (step S10). Then, the present routine is terminated and measurement is performed using the rims B as the object rims 70a.

Figure 5:
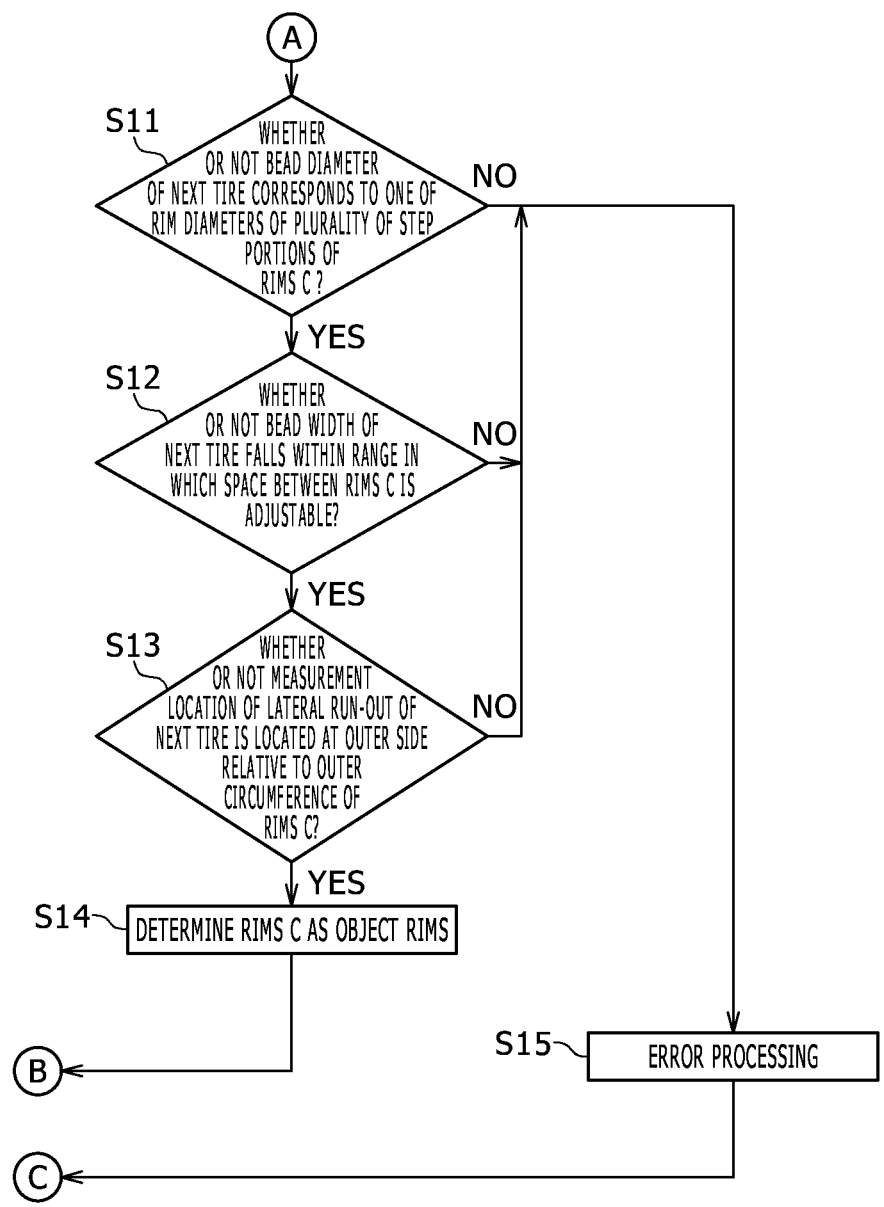
FIG. 5 is a flowchart illustrating the rim replacing processing for the tire testing machine.

In step S11 in FIG. 5, whether or not the bead diameter of the next tire corresponds to one of rim diameters of the plurality of step portions 73 of the rims C is determined. In step S11, if the bead diameter of the next tire is determined to correspond to none of the rim diameters of the plurality of step portions 73 of the rims C (S11: NO), the processing proceeds to step S15. On the other hand, in step S11, if the bead diameter of the next tire is determined to correspond to one of the rim diameters of the plurality of step portions 73 of the rims C (S11: YES), whether or not the bead width of the next tire falls within a range in which a space between the rims C is adjustable is determined (step S12).

In step S12, if the bead width of the next tire is determined to fail to fall within the range in which the space between the rims C is adjustable (S12: NO), the processing proceeds to step S15. On the other hand, in step S12, if the bead width of the next tire is determined to fall within the range in which the space between the rims C is adjustable (S12: YES), whether or not the measurement location of the lateral run-out of the next tire is located at an outer side relative to an outer circumference of the rims C is determined (step S13).

In step S13, if the measurement location of the lateral run-out of the next tire is determined to fail to be located at the outer side relative to the outer circumference of the rims C (S13: NO), the processing proceeds to step S15. On the other hand, in step S13, if the measurement location of the lateral run-out of the next tire is determined to be located at the outer side relative to the outer circumference of the rims C (S13: YES), the rims C are determined as the object rims 70a (step S14). Then, the rim replacement between the current rims and the rims C is performed (step S10). Then, the present routine is terminated and measurement is performed using the rims C as the object rims 70a.

In step S15, error processing is performed. In other words, a notification in which none of the "current rims," the "rims B," and the "rims C" copes with the next tire is made to an operator. Then, the present routine is terminated. The operator stops a production operation to perform the rim replacement between the exterior and the rim replacing device 50.

Note that, in this embodiment, the three conditions in which the bead diameter of the next tire corresponds to one of the rim diameters of the plurality of step portions 73, the bead width of the next tire falls within the range in which the space is adjustable, and the measurement location of the lateral run-out of the next tire is located at the outer side relative to the outer circumference are set as the predetermined conditions and the object rims 70a that satisfy all of these conditions are selected, but this embodiment is not limited to this configuration. The two conditions in which the bead diameter of the next tire corresponds to one of the rim diameters of the plurality of step portions 73, and the bead width of the next tire falls within the range in which the space is adjustable may be set as the predetermined conditions, and the object rims 70a that satisfy all of these conditions may be selected. Moreover, the two conditions in which the bead diameter of the next tire corresponds to one of the rim diameters of the plurality of step portions 73, and the measurement location of the lateral run-out of the next tire is located at the outer side relative to the outer circumference may be set as the predetermined conditions, and the object rims 70a that satisfy all of these conditions may be selected.

(Effects)

As described above, according to the rim replacing method for the tire testing machine according to this embodiment, the object rims 70a having a diameter corresponding to a diameter of the bead portions of the test tire 10 conveyed into the tire testing machine 100 are selected, whereby the object rims 70a can be fitted to the bead portions of the test tire 10 without a gap to sandwich the same. Accordingly, leakage of the air from between the bead portions and the object rims 70a during filling of the air into the test tire 10 and breakage of the test tire 10 during measurement can be prevented. Further, the object rims 70a in which a width of the bead portions of the test tire 10 conveyed into the tire testing machine 100 falls within the range in which the space is adjustable are selected, whereby the bead portions of the test tire 10 can be suitably sandwiched such that the upper rim 71 and the lower rim 72 fail to come into contact with each other. Accordingly, breakage of the upper rim 71 and the lower rim 72 due to contact thereof with each other can be prevented. Still further, the object rims 70a in which the measurement location of the lateral run-out in the test tire 10 conveyed into the tire testing machine 100 is located at the outer side relative to the outer circumference are selected, whereby interference of the object rims 70a with the measurement location of the lateral run-out can be prevented. Consequently, the lateral run-out can be safely measured. In this manner, configuring the predetermined conditions of selecting the object rims 70a to be detailed enables selection of the rims 70 more suitable for the test tire 10 conveyed into the tire testing machine 100. Accordingly, the nonuniformity can be suitably measured.

Second Embodiment

Controller

Figure 6:
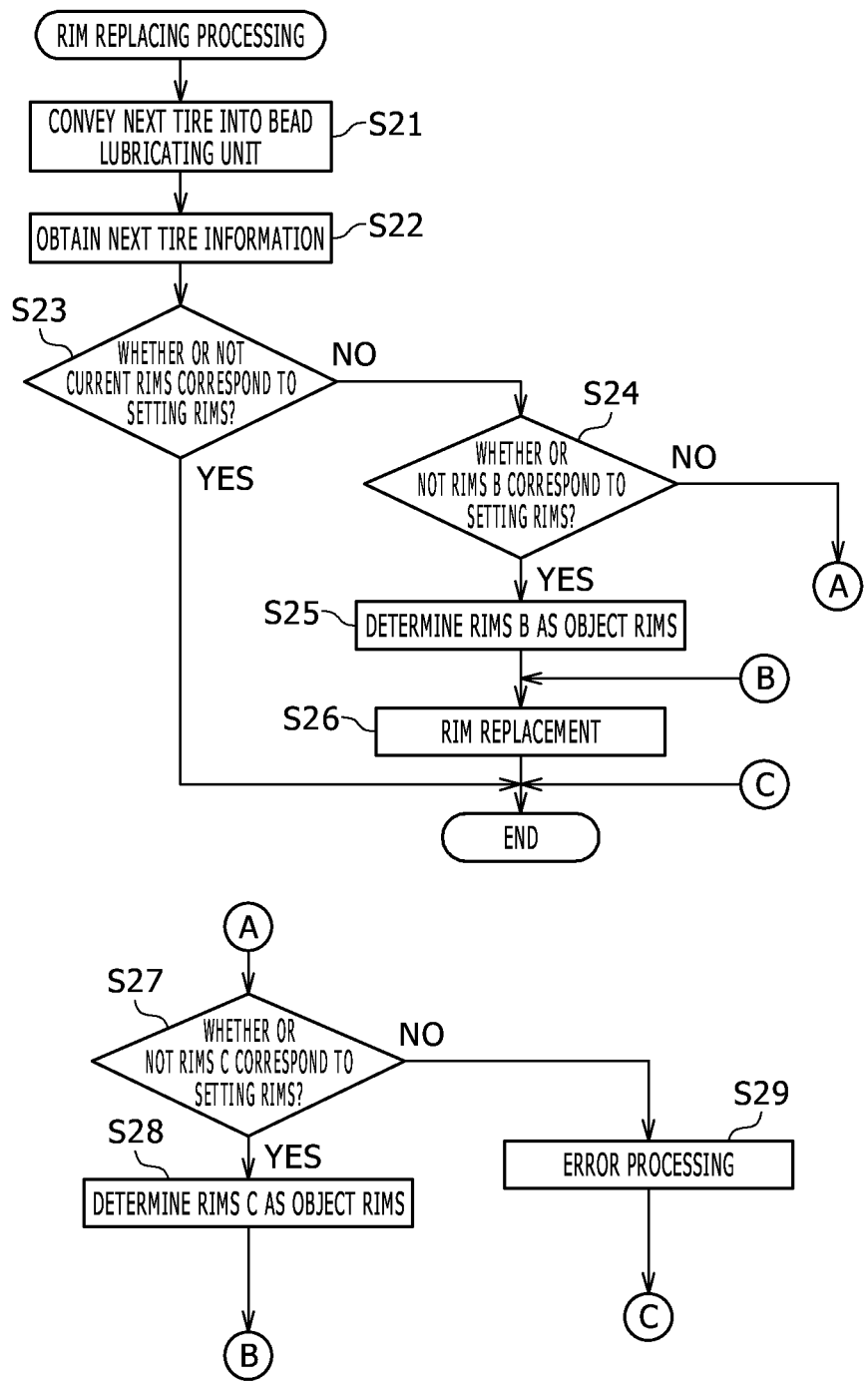
FIG. 6 is a flowchart illustrating the rim replacing processing for the tire testing machine.

A rim replacing method for a tire testing machine (rim replacing method) according to a second embodiment of the present invention will be described. Note that the same reference numerals will be provided to the same components as the above-described components, and the description thereof will be omitted. The rim replacing method according to this embodiment differs from the rim replacing method according to the first embodiment in that, as illustrated in FIG. 6 that is a flowchart, the controller 61 selects, as the object rims 70a, the rims 70 associated with the test tire 10 (next tire) conveyed into the testing station 30. The rims 70 associated with the next tire are hereinafter referred to as "setting rims."

Here, the rims 70 that satisfy measurement conditions relative to are associated in advance with each test tire 10 of a plurality of types. For example, if there are tires A to C of three types different from each other, the current rims are associated with the tire A, the rims B are associated with the tire B, and the rims C are associated with the tire C. Then, the current rims associated with the tire A include the step portions 73 having a rim diameter that copes with a bead diameter of the tire A, a bead width of the tire A falls within the range in which the space is adjustable, and a measurement location of the lateral run-out of the tire A is located at an outer side relative to an outer circumference thereof. The same applies to the rims B associated with the tire B and the rims C associated with the tire C. Accordingly, selecting the current rims that are the "setting rims" during measurement of the tire A can thereby satisfy the measurement conditions.

A barcode included in the test tire 10 includes information of the "setting rims." The controller 61 controls the tire testing machine 100 in such a manner as to perform a selection step of selecting, from among the "current rims" that are attached to the upper and lower spindles 32 and the "rims B" and "rims C" that are loaded in the rim replacing device 50, the "setting rims" associated with the test tire 10 as the object rims 70a, and the above-described replacement step. In other words, the controller 61 selects the rims 70 corresponding to the "setting rims" of the test tire 10.

(Rim Replacing Processing Routine)

The rim replacing method will be described with reference to a rim replacing processing routine illustrated in FIG. 6. This rim replacing processing routine is executed by the controller 61. First, the next tire is conveyed into the bead lubricating unit 20 (step S21). Subsequently, a barcode on the next tire is read by the barcode scanner 62, thereby obtaining information of the next tire (step S22).

Then, whether or not the current rims correspond to the setting rims is determined (step S23). In step S23, if the current rims are determined to fail to correspond to the setting rims (S23: NO), the processing proceeds to step S24. On the other hand, in step S23, if the current rims are determined to correspond to the setting rims (S23: YES), the present routine is terminated. Then, measurement is performed using the current rims as the object rims 70*a*.

In step S24, whether or not the rims B correspond to the setting rims is determined. In step S24, if the rims B are determined to fail to correspond to the setting rims (S24: NO), the processing proceeds to step S27. On the other hand, in step S24, if the rims B are determined to correspond to the setting rims (S24: YES), the rims B are determined as the object rims 70*a* (step S25). Then, the rim replacement between the current rims and the rims B is performed (step S26). Then, the present routine is terminated and measurement is performed using the rims B as the object rims 70*a*.

In step S27, whether or not the rims C correspond to the setting rims is determined. In step S27, if the rims C are determined to fail to correspond to the setting rims (S27: NO), the processing proceeds to step S29. On the other hand, in step S27, if the rims C are determined to correspond to the setting rims (S27: YES), the rims C are determined as the object rims 70*a* (step S28). Then, the rim replacement between the current rims and the rims C is performed (step S26). Then, the present routine is terminated and measurement is performed using the rims C as the object rims 70*a*.

In step S29, error processing is performed. In other words, a notification in which none of the "current rims," the "rims B," and the "rims C" copes with the next tire is made to an operator. Then, the present routine is terminated. The operator stops a production operation to perform the rim replacement between the exterior and the rim replacing device 50.

Note that, in this embodiment, all the three conditions in which the "setting rims" include the step portions 73 having a rim diameter that copes with a bead diameter of the next tire, a bead width of the next tire falls within the range in which the space is adjustable, and a measurement location of the lateral run-out of the next tire is located at an outer side relative to an outer circumference thereof may be satisfied, but this embodiment is not limited to this configuration. The two conditions in which the "setting rims" include the step portions 73 having a rim diameter that copes with a bead diameter of the next tire, and a bead width of the next tire falls within the range in which the space is adjustable may be satisfied. Moreover, the two conditions in which the "setting rims" include the step portions 73 having a rim diameter that copes with a bead diameter of the next tire, and a measurement location of the lateral run-out of the next tire is located at an outer side relative to an outer circumference thereof.

(Effects)

As described above, according to the rim replacing method for the tire testing machine according to this embodiment, selecting, as the object rims 70*a*, the "setting rims" associated with the test tire 10 conveyed into the tire testing machine 100 can thereby satisfy the measurement conditions. Accordingly, the nonuniformity can be suitably measured.

While the embodiments of the invention have been described above, these are merely specific examples. In particular, the invention is not limited to the embodiments, and the specific configuration and the like may be appropriately modified in design. Further, the operation and the effect described in the embodiments of the invention are merely the operation and the effect which are most appropriately obtained by the invention, and the operation and the effect obtained by the invention are not limited to the embodiments of the invention.

For example, in the first embodiment and the second embodiment, a multi-step rim that copes with a plurality of types of rim diameters is employed, but a single rim that copes with one type of rim diameter may be alternately employed.

What is claimed is:

1. A rim replacing method for a tire testing machine in which a pair of rims attached to upper and lower spindles and any of a plurality of pairs of rims loaded in a rim replacing device are replaced with each other, the method comprising:
a selection step of selecting, from among the pair of rims and the plurality of pairs of rims, one pair of rims satisfying predetermined conditions relative to a tire conveyed into the tire testing machine as object rims; and
a replacement step of replacing the pair of rims with the object rims if the rims loaded in the rim replacing device are selected as the object rims,
wherein the predetermined conditions include a condition in which a diameter of bead portions of the tire conveyed into the tire testing machine corresponds to a diameter of the object rims, and a condition in which a width of the bead portions of the tire conveyed into the tire testing machine falls within a range in which a space between the object rims is adjustable.

2. The rim replacing method for the tire testing machine according to claim 1,
wherein rims that satisfy measurement conditions are associated in advance with the tire conveyed into the tire testing machine, and
the predetermined conditions include association with the tire conveyed into the tire testing machine.

3. A rim replacing method for a tire testing machine in which a pair of rims attached to upper and lower spindles and any of a plurality of pairs of rims loaded in a rim replacing device are replaced with each other, the method comprising:
a selection step of selecting, from among the pair of rims and the plurality of pairs of rims, one pair of rims satisfying predetermined conditions relative to a tire conveyed into the tire testing machine as object rims; and
a replacement step of replacing the pair of rims with the object rims if the rims loaded in the rim replacing device are selected as the object rims,
wherein the predetermined conditions include a condition in which a diameter of bead portions of the tire conveyed into the tire testing machine corresponds to a diameter of the object rims, and a condition in which a measurement location of the lateral run-out in the tire conveyed into the tire testing machine is located at an outer side relative to an outer circumference of the object rims.

4. The rim replacing method for the tire testing machine according to claim 3,
wherein the predetermined conditions include a condition in which a width of the bead portions of the tire conveyed into the tire testing machine falls within a range in which a space between the object rims is adjustable.

5. The rim replacing method for the tire testing machine according to claim 3,
wherein rims that satisfy measurement conditions are associated in advance with the tire conveyed into the tire testing machine, and
the predetermined conditions include association with the tire conveyed into the tire testing machine.

* * * * *